(12) United States Patent
Berning

(10) Patent No.: US 9,531,017 B2
(45) Date of Patent: Dec. 27, 2016

(54) METHOD OF OPERATING A FUEL CELL

(71) Applicant: Aalborg Universitet, Aalborg Ø (DK)

(72) Inventor: Torsten Berning, Aalborg (DK)

(73) Assignee: Aalborg Universitet, Aalborg Ø (DK)

(*) Notice: Subject to any disclaimer, the term of this patent is extended or adjusted under 35 U.S.C. 154(b) by 208 days.

(21) Appl. No.: 14/398,869

(22) PCT Filed: May 7, 2013

(86) PCT No.: PCT/DK2013/050130
§ 371 (c)(1),
(2) Date: Nov. 4, 2014

(87) PCT Pub. No.: WO2013/167134
PCT Pub. Date: Nov. 14, 2013

(65) Prior Publication Data
US 2015/0118586 A1   Apr. 30, 2015

(30) Foreign Application Priority Data

May 7, 2012   (DK) ................................. 2012 70231

(51) Int. Cl.
*H01M 8/04* (2016.01)
*H01M 8/10* (2016.01)

(52) U.S. Cl.
CPC ....... *H01M 8/04029* (2013.01); *H01M 8/0485* (2013.01); *H01M 8/04119* (2013.01);
(Continued)

(58) Field of Classification Search
CPC ............ H01M 8/0485; H01M 8/04119; H01M 8/04313; H01M 8/04402; H01M 8/04701; H01M 8/04768; H01M 8/04029; H01M 8/04291; H01M 2300/0082; H01M 2008/1095; H01M 8/04753; Y02E 60/50
See application file for complete search history.

(56) References Cited

U.S. PATENT DOCUMENTS 5,000,050 A * 3/1991 Hetrick ..................... G01F 1/20
                                                       73/32 A
6,087,028 A   7/2000 Goto
(Continued)

FOREIGN PATENT DOCUMENTS

JP    2007-172971 A    7/2007
WO   WO 2008/142564 A1   11/2008

OTHER PUBLICATIONS

Atiyeh, Hasan K. et al., "Experimental investigation of the role of a microporous layer on the water transport and performance of a PEM fuel cell" Journal of Power Sources, 2007, pp. 111-121, vol. 170.

Berning, Torsten "The dew point temperature as a criterion for optimizing the operating conditions of proton exchange membrane fuel cells" International Journal of Hydrogen Energy, 2012, pp. 10265-10275, vol. 37.

(Continued)

*Primary Examiner* — Muhammad Siddiquee
(74) *Attorney, Agent, or Firm* — Knobbe Martens Olson & Bear LLP

(57) ABSTRACT

The present invention relates to a method of determining the net water drag coefficient ($r_d$) in a fuel cell. By measuring the velocity of the fluid stream at the outlet of the anode, $r_d$ can be determined. Real time monitoring and adjustments of the water balance of a fuel cell may be therefore achieved.

12 Claims, 2 Drawing Sheets

(52) U.S. Cl.
CPC ... *H01M 8/04291* (2013.01); *H01M 8/04313* (2013.01); *H01M 8/04402* (2013.01); *H01M 8/04701* (2013.01); *H01M 8/04768* (2013.01); *H01M 8/04753* (2013.01); *H01M 2008/1095* (2013.01); *H01M 2300/0082* (2013.01); *Y02E 60/50* (2013.01)

(56) References Cited

U.S. PATENT DOCUMENTS

| | | | |
|---|---|---|---|
| 6,119,529 | A | 9/2000 | Di Marco et al. |
| 6,586,128 | B1* | 7/2003 | Johnson .............. H01M 8/0258 429/443 |
| 2003/0003330 | A1 | 1/2003 | Ballantine et al. |
| 2005/0037247 | A1 | 2/2005 | Takahashi |
| 2007/0190384 | A1* | 8/2007 | Tasaki ................ B01D 67/0093 429/447 |
| 2009/0155651 | A1 | 6/2009 | Orihashi |
| 2014/0255807 | A1* | 9/2014 | Narayanan ........ H01M 8/04007 429/416 |

OTHER PUBLICATIONS

He, Guangli et al., "The real-time determination of net water transport coefficient based on measurement of water content in the outlet gas in a polymer electrolyte fuel cell" Journal of Power Sources, 2010, pp. 4722-4726, vol. 195.

International Search Report for PCT/DK2013/050130 dated Jul. 12, 2013.

\* cited by examiner

METHOD OF OPERATING A FUEL CELL

CROSS REFERENCE TO RELATED APPLICATIONS

This application is a U.S. National Phase Application of PCT International Application Number PCT/DK2013/050130, filed on May 7, 2013, designating the United States of America and published in the English language, which is an International Application of and claims the benefit of priority to Danish Patent Application No. PA 2012 70231, filed on May 7, 2012. The disclosures of the above-referenced applications are hereby expressly incorporated by reference in their entireties.

FIELD OF THE INVENTION

The present invention relates to a method of determining the net water drag coefficient ($r_d$) in a fuel cell. The present invention also relates to a method of operating a fuel cell comprising determining the net water drag coefficient and to a method of monitoring and adjusting the water balance of a fuel cell. The present invention further relates to a fuel cell assembly.

BACKGROUND OF THE INVENTION

A common problem in fuel cell operation is water management.

In proton exchange membrane (PEM) fuel cells, the polymer electrolyte membrane that conducts the protons and repels electrons can only function properly when it is sufficiently hydrated, so that the incoming gas streams are typically pre-humidified when entering the fuel cell. Furthermore, the so-called electro-osmotic drag effect leads to water being transported through the membrane from the anode side to the cathode side, and the maximum current density that can be drawn from the fuel cell might be limited by the fact that the anode gas dries out.

Water management in fuel cell has been generally investigated by trial-and-error, through a large number of experiments varying cell performance by varying temperature, pressure, stoichiometric flow ratio and the relative humidity of the gases at the respective inlets.

In water balance experiments, the typical approach is to condense the anode and cathode exit gas streams and weigh the amount of liquid water.

This method is reliable. However, it can be very time consuming as it can take many hours to collect sufficient water for a measurement and the error margin is quite high due to partial evaporation of the collected water. Moreover, it can only be applied to fuel cell with a sufficiently large area in order to collect enough water for a reliable water balance.

Importantly, this method is not suitable to be applied to a fuel cell powered vehicle as it cannot provide real time measurement.

It is therefore desirable to have a method for managing water balance in fuel cell which provides more accurate data, and real time measurement, thus enabling to communicate the water balance to the fuel cell controller at any given time.

Hence, an improved method of operating a fuel cell would be advantageous, and in particular a more efficient and/or reliable method for monitoring and adjusting the water balance would be advantageous.

OBJECT OF THE INVENTION

It is an object of the invention to provide a method of operating a fuel cell which provides more accurate data, and real time measurements so as to enable real time control of the water balance of a fuel cell.

In particular, it may be seen as an object of the present invention to provide a method of operating a fuel cell that solves the above mentioned problems of the prior art by determining the net water drag coefficient ($r_d$) in a fuel cell.

It is another object of the invention to provide a method of monitoring and adjusting the water balance of a fuel cell that can operate in real time and that provides ad-hoc determination of the fuel cell water balance.

It is a further object of the invention to provide a fuel cell assembly enabling the real time determination of the water balance of a fuel cell.

It is an even further object of the present invention to provide an alternative to the prior art.

SUMMARY OF THE INVENTION

Fuel Cells used in commercial applications may be classified by the electrolyte that the fuel cell employs. For example, proton exchange membrane (PEM) fuel cells are characterized by a cathode and anode separated by a thin membrane, such as a solid polymer as electrolyte.

PEM fuel cells directly convert into electricity hydrogen and oxygen gases from air, the by-product being water and waste heat. The anode and cathode side half-cell reactions are as follows:

Anode: $2H_2 \rightarrow 4H^+ + 4e^-$

Cathode: $O_2 + 4H^+ + 4e^- \rightarrow 2H_2O$

Combined: $2H_2 + O_2 \rightarrow 2H_2O$

It can be noticed that water is produced at the cathode side.

The cathode is separated from the anode side by a proton exchange membrane typically having a thickness between 10 and 200 μm. However, a fraction of the produced water typically diffuses through the membrane so that it is will exit with the anode outlet steam, including some residual hydrogen gas.

Generally fuel cell operates with humidified gases; however it has been found that fuel cells can also operate on dry inlet gases, i.e. without the need for external humidification.

The method of the invention stems from the observation that it might not be necessary to pre-humidify the gases to be fed to a fuel cell, and that fuel cells might be operated on completely dry reactant gases, which is highly desirable in order to reduce system cost and complexity.

It may therefore be foreseen that fuel cell will run on completely dry reactant gases, especially at the anode, where pure hydrogen gas shall enter the cell. In these conditions, when the anode side gas is fed dry, i.e. without external humidification, it has been found that the net drag coefficient ($r_d$) as defined below, is in relation to the molar stream of product water leaving at the anode side over the amount of product water.

Thus the above described object and several other objects are intended to be obtained in a first aspect of the invention by providing a method of determining the net water drag coefficient ($r_d$) in a fuel cell, the method comprising:

measuring the velocity of a stream of fluid at the outlet of at least one electrode of a fuel cell and determining $r_d$ as a function of the velocity measurement.

The method according to the first aspect of the invention stems for from the observation that net water drag coefficient ($r_d$) at the anode is related to the velocity of the exit gas stream at the anode side of a PEM fuel cell.

The net drag coefficient ($r_d$) is herein defined as $$r_d = (nw\_an\_in - nw\_an\_out)/(J/F)$$

Where nw are the molar streams of water at the anode inlet and outlet, J is the total current drawn from the fuel cell (in Ampere), and F is the Faraday's constant (96485 C/mole).

When the anode gas enters dry, $r_d$ can only be negative, which means that some part of the product water leaves at the anode side. Simulations have shown that $r_d$ typically ranges between 0.1 and 0.0 when both gases enter the fuel cell completely dry.

Provided the fuel cell current density is known and the area of the anode outlet channel or pipe is known the measured velocity of a stream of fluid, such as product water and excess hydrogen at the outlet of one electrode, such as the anode can be converted into a mass flow rate and in turn the mass flow rate can be converted into a molar stream providing the direct relationship between velocity and net drag coefficient.

In some embodiments nitrogen gas may crossed over from the cathode side to the anode side and there a minor fraction of nitrogen leaving the cell along with the hydrogen and water vapor may affect the velocity reading. Thus the means for measuring the velocity of the stream of fluids may have to be calibrated. However it appears that, according to estimate of the nitrogen cross over, the effect on nitrogen gas may be neglected. Thus in the calculation of the measured outlet velocity the contribution due to the nitrogen gas cross over was neglected.

By making use of this relation the invention provides an accurate and ad-hoc determination of the fuel cell water balance for providing immediate feedback to the fuel cell control which can be advantageously applied to fuel cell powered vehicles and the general technical inspection thereof.

In some embodiments according to any aspect of the invention, the fuel cell is a proton exchange membrane (PEM) fuel cell.

In some other embodiments, according to any aspect of the invention the at least one electrode is the anode of the fuel cell.

In some further embodiments, according to any aspect of the invention the relation between the measured velocity (v) of a stream of fluid at the outlet of at least one electrode of the fuel cell and $r_d$ is linear or substantially linear.

In some further embodiments according to any aspect of the invention the measured velocity is in the range between 0.3 and 30 m/s.

The velocity may be in the range between 0.1 and 100 m/s, preferably in the range between 0.2 and 70 m/s, even more preferably in the range between 0.3 and 50 m/s, such as in the range between 0.3 and 30 m/s.

The velocity may depend on the diameter of the outlet pipe and the size of the stack and the current density drawn from the stack.

Optimal velocity may depend also on the means used for measuring the fluid stream velocity. For example, when a hot wire anemometer is used the optimal velocity may be within 0.3 and 30 m/s.

Velocity may be measured by any means for measuring fluid stream velocity.

Velocity within the range of the one at the anode outlet are preferentially measured by a hot-wire anemometer that allows for measurements of rapid velocity fluctuation, providing a high accuracy.

Thus, in some further embodiments according to any aspect of the invention the velocity is measured by a hot wire anemometer.

In some further embodiments, according to any aspect of the invention the stoichiometric flow ratio ($\xi$) of the fluid fed to the fuel cell is in the range between 1.0 and 1.5.

Generally due to mass transport limitations fuel cells have to be operated over stoichiometrically, i.e. more oxygen and hydrogen gas has to be fed to the cell than is consumed in the electrochemical reactions occurring at the anode and cathode.

However, modelling studies have demonstrated the possibility of operating a PEM fuel cell at low stoichiometric flow ratios on completely dry inlet gases.

Thus, fuel cells can also operate at low stoichiometric flow ratios, e.g. $\xi < 1.5$. It has been found in a modeling study that stoichiometric flow ratio as low as 1.05 can be employed at the anode side.

This has a great advantage as especially at the anode side this greatly simplifies the system and reduces cost.

It appears that for dry fluid flow and within a low stoichiometric flow rations, i.e. ($\xi$) between 1.0 and 1.5 the relation between $r_d$ and the anode outlet fluid stream velocity is linear, allowing for direct determination of the $r_d$ through the measurement of the anode outlet fluid stream velocity.

The stoichiometric flow rations may also be in the range between 1.0 and 1.2, preferably between 1.0 and 1.05.

The above described object and several other objects are intended to be obtained in a second aspect of the invention by providing a method of operating a fuel cell, the method comprising: determining $r_d$ in a fuel cell according to the first aspect of the invention and adjusting the temperature of the fuel cell as a function of the variation of $r_d$.

In some embodiments according to the second aspect of the invention adjusting the temperature of the fuel cell comprises adjusting the flow rate of a liquid cooling the fuel cell as a function of the variation of the net water drag coefficient. In some other embodiments according to the second or other aspect of the invention, adjusting the temperature of the fuel cell may lie within the competence of the person skilled in the art.

The above described object and several other objects are intended to be obtained in a third aspect of the invention by providing a method of operating a fuel cell, the method comprising: determining the net water drag coefficient in a fuel cell and adjusting the temperature of the fuel cell as a function of the variation of the net water drag coefficient.

In some embodiments according to the third aspect of the invention adjusting the temperature of the fuel cell comprises adjusting the flow rate of a liquid cooling said fuel cell as a function of the variation of the net water drag coefficient.

The coolant flow rate adjusts the fuel cell temperature as well as the temperature gradient in the fuel cell.

It has been found that the net water drag coefficient is a key parameter for the determination of the dew point temperatures of the outlet gas streams, and that the gas stream velocity at the anode side when a fuel cell is operated on dry hydrogen is directly correlated to $r_d$.

The dew point temperatures of the anode and cathode outlet gases depend strongly on $r_d$. It is advantageous to operate the fuel cell close to the respective dew point temperatures, i.e. if the cathode outlet temperature is equal to the dew point temperature of the cathode outlet gas, then the gas is 100% humidified. A 100% humidification keeps the membrane conductive. Likewise, if the anode outlet temperature is equal to the temperature of the anode outlet gas, then this gas is 100% humidified.

Humidity is herein defined as relative humidity.

Thus, detected changes in outlet velocity due to variation of $r_d$ may be corrected by temperature adjustment, i.e. by changing the flow rate of the coolant fluid. The anode and cathode outlet temperatures can be adjusted by the coolant flow rate and coolant inlet temperature so that the membrane may stay humidified at both ends.

In some embodiments according to the second or third aspect of the invention adjusting the temperature of said fuel cell comprises adjusting the flow rate of a liquid coolant so that the temperature gradient from inlet to outlet should be within a specific range of temperature, such as between 0 and 10 C, preferably between 0 and 8 degrees, even more preferably between 0 and 5 C.

Thus, an advantage of the invention is the ability of providing a real time determination of the fuel cell water balance allowing for adjustment of such a water balance by temperature variations.

The above described object and several other objects are also intended to be obtained in a fourth aspect of the invention by providing a method for monitoring and adjusting the water balance of a fuel cell, the method comprising: determining $r_d$ in a fuel cell according to the first aspect of the invention, and adjusting the temperature of the fuel cell as a function of the variation of the $r_d$.

Thus the invention in one of its aspect relates to a method for accurate determination of fuel cell water balance. Water management in PEM fuel cells is crucial to avoid cell flooding on the cathode side and membrane drying out on the anode side and to ensure drawing the maximum current density out of the cell. The great advantage of the invention is that ad-hoc, on line monitoring of the water balance in a PEM fuel cell can be obtained with a simple method allowing for several applications, e.g. in fuel cell powered vehicles.

The above described object and several other objects are intended to be obtained in a fifth aspect of the invention by providing a fuel cell assembly comprising: a fuel cell comprising two electrodes and means for measuring gas outlet velocity at least at one of the two electrodes.

In some embodiments according to the fifth aspect of the invention the fuel cell is a PEM fuel cell.

In some further embodiments according to the fifth aspect of the invention the at least one of the electrode is the fuel cell anode.

In some further embodiments according to the fifth aspect of the invention the means for measuring gas outlet velocity is a hot wire anemometer.

A further advantage of using a hot wire anemometer is that it yields a digital output that can be used in the car computer for fuel cell diagnosis.

An even further advantage of using a hot wire anemometer is that the same anemometer may also be used for directly measuring the relative humidity at the anode outlet.

In that in some embodiments the hot wire anemometer may be used for measuring both stream velocity and relative humidity at the anode outlet.

Other means for measuring velocity may be used having similar or lower accuracy than the hot wire anemometer.

In some further embodiments according to the fifth aspect of the invention the fuel cell assembly further comprises means for adjusting the fuel cell temperature as a function of the measured gas velocity at the outlet of at least one of the two electrodes.

In some further embodiments according to the fifth aspect the means for adjusting the fuel cell temperature comprises a flow regulator for the coolant fluid of the fuel cell.

The applicability of the invention in all its aspect may be limited to the use of dry gases, at least on the anode side, at low stoichiometric flow ratio, i.e. between 1.0 and 1.5, so as to achieve linearity between $r_d$ and fluid stream velocity at the anode outlet and preferentially within a specific velocity range, i.e. 0.3-30 m/s. However, the method may be improved so that these limitations are taken in consideration in the determination of the $r_d$ thus allowing the application of the method also within different ranges of stoichiometric flow ratio and fluid stream velocity.

The first, second and other aspect and embodiments of the present invention may each be combined with any of the other aspects and embodiments. These and other aspects and embodiments of the invention will be apparent from and elucidated with reference to the embodiments described hereinafter.

BRIEF DESCRIPTION OF THE FIGURES

The methods and fuel cell assembly according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
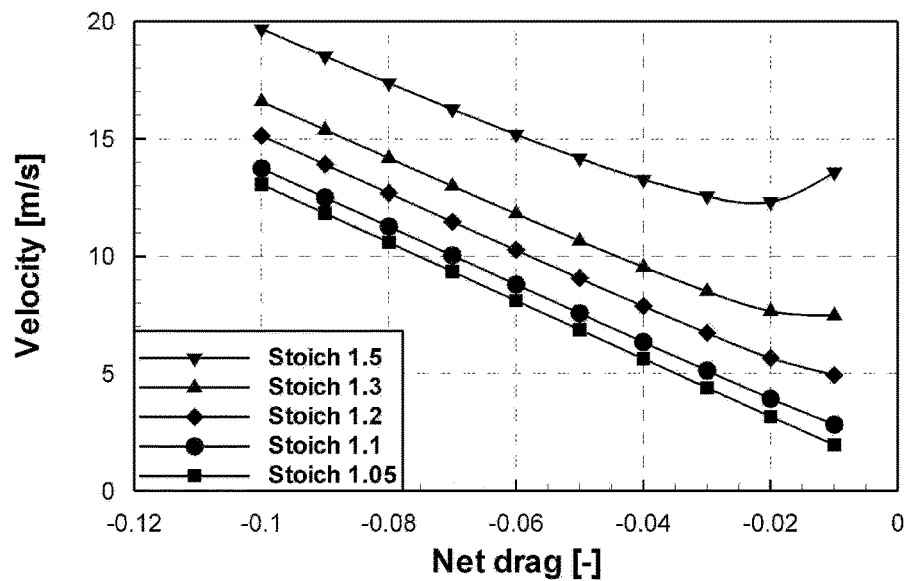
FIG. 1 shows the linear relation between the fluid stream velocities at the outlet of the anode in m/s vs the net drag coefficient for different stoichiometric flow ratios.

FIG. 1 shows the linear relation between the fluid stream velocities at the outlet of the anode in m/s vs the net drag coefficient for different stoichiometric flow ratios.

It has been found that $r_d$ may be determined through measurement of the exit gas stream velocity at the anode side when the fuel cell is operated on dry hydrogen. The velocity v can be calculated by:

$$v = \frac{\dot{m}_m}{\rho_m \times A}$$

Where $\rho_m$ is the mixture density, $m_m$ is the total mass flow rate and A is the area of the exit channel or pipe.

Neglecting the cross-over of nitrogen the mass flow rate of the binary mixture at the anode exit is:

$$\dot{m}_m = \dot{m}_{H_2} + \dot{m}_{H_2O}$$
$$= \dot{N}_{H_2} M_{H_2} + \dot{N}_{H_2O} M_{H_2O}$$
$$= (\xi_{an} - 1)\frac{I}{2F} M_{H_2} - r_d \frac{I}{2F} M_{H_2O}$$

Which introduces the stoichiometric flow ratio $\xi$ to calculate the molar flow rate of hydrogen as function of the total current I according to:

$$\dot{N}_{H_2} = (\xi_{an} - 1)\dot{N}_{H_2,nom} = (\xi_{an} - 1)\frac{I}{2F}$$

F denotes the Faraday constant (96485 C/mole) and M denotes the molecular weight of the different species. The definition of the effective drag coefficient of water through the polymer electrolyte membrane is:

$$r_d = \frac{\dot{N}_{H_2O,an,in} - \dot{N}_{H_2O,an,out}}{I/2F}$$

Which yields a molar flow rate of water at the anode outlet according to:

$$\dot{N}_{H_2O,an,out} = -r_d \frac{I}{2F}$$

$M_{H2}$ and $M_{H2O}$ are the molecular masses of hydrogen and water, respectively.

The mixture density $\rho_m$ is calculated using the mass fractions $\gamma$ of the species:

$$\rho_m = y_{H_2} \times \rho_{H_2} + y_{H_2O} \times \rho_{H_2O}$$
$$= \frac{\dot{m}_{H_2}}{\dot{m}_{H_2} + \dot{m}_{H_2O}} \times \rho_{H_2} + \frac{\dot{m}_{H_2O}}{\dot{m}_{H_2} + \dot{m}_{H_2O}} \times \rho_{H_2O}$$

For example, at 80° C. and 1 bar pressure the density of hydrogen is around $\rho_{H2}$=0.0696 kg/m³, and the density of water vapour at this temperature and pressure is $\rho_{H2O}$=0.6138 kg/m³ assuming ideal gas behaviour.

With these values the gas flow velocity can now be calculated from the equation above, provided the total cell current and the area of the flow channel or pipe is known. Assuming a total cell current of 8000 A (0.4 A/cm² for a cell with an area of 20,000 cm²), and an outlet pipe with an inner diameter of 5 mm the outlet velocity can be calculated as function of the stoichiometric flow ratio and $r_d$. This is shown in the FIG. 1.

From FIG. 1 the correlation between the outlet velocity and the net drag becomes almost linear when the stoichiometric flow ratio $\xi_{an}$ is sufficiently low. Linear correlation between outlet velocity and $r_d$ allows for evaluation of $r_d$ through direct measurement of outlet velocity.

Outlet velocity may be measured with good accuracy through measuring means such as a hot wire anemometer. The hot wire anemometer may be placed into the exit stream before the gases are vented out.

An example for the range of a hot wire anemometer is as low as 0.4 m/s-30 m/s., while measuring the humidity within a range of 10%-95%. Obviously, in an automotive fuel cell stack of 60-90 kW the anode outlet velocities should be high enough to be measured with good accuracy using hot wire anemometry, and this allows for online determination of the lump net drag coefficient of the fuel cell stack for diagnosis purposes.

Figure 2:
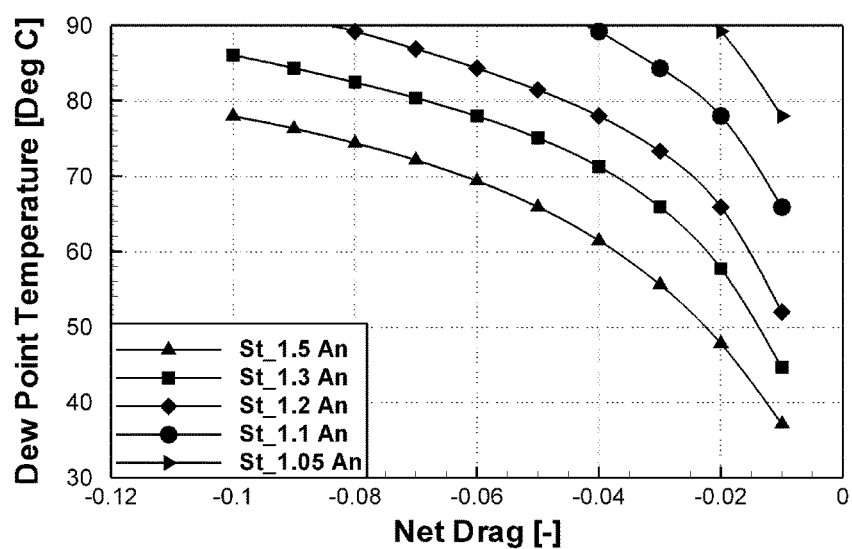
FIG. 2 shows the relation between the dew point temperatures and the net drag coefficient for different stoichiometric flow ration for an ambient operating pressure.

FIG. 2 shows the relation between the dew point temperatures and the net drag coefficient for different stoichiometric flow ration for an ambient operating pressure. Due to the dependence of the dew point temperatures on the gas phase pressure, different relations between dew point temperatures and net drag coefficient may be observed at different operating pressure. For example, an increase in operating pressure leads to an increase in the dew point temperature which means that the stoichiometry would have to be increased in order to avoid electrodes flooding. In some embodiments the measurement of the velocity and the relative humidity may be conducted at atmospheric pressure. The anode side of the fuel cell may operate at an elevated pressure and the outlet gases may be expanded to atmospheric pressure behind the fuel cell. This expansion leads to a decreased relative humidity of the outlet gas, and hence the danger of having droplets entrained in the gas phase which will affect the reading accuracy is decreased. In these embodiments the probe should be placed directly behind the anode outlet but ideally after the gases have been expanded, e.g. means for reducing the pressure, such as an expansion valve, may be introduced at location 14.

Figure 3:
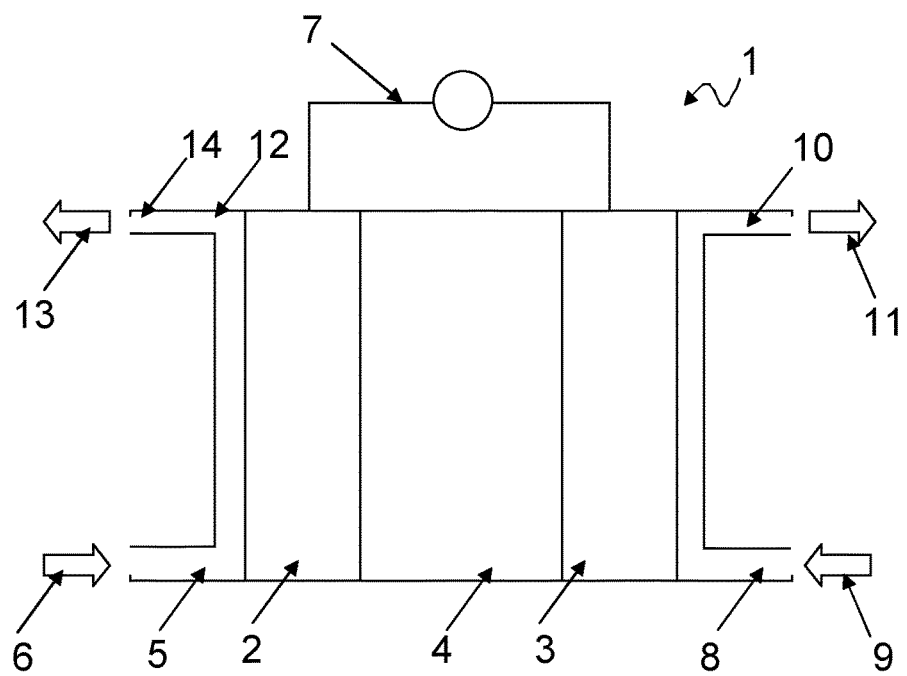
FIG. 3 is a schematic drawing of a fuel cell assembly according to one of the aspect of the invention.

FIG. 3 is a schematic drawing of a fuel cell assembly according to one of the aspect of the invention.

The fuel cell assembly 1 is a PEM fuel cell, characterized by two electrodes, i.e. anode 2 and cathode 3 separated by a polymer electrolyte membrane 4 such as a solid polymer having the function of an electrolyte. At the inlet 5 of the anode 2 fuel, such as hydrogen gas, is fed to the fuel cell following the direction of arrow 6. At the anode 2, hydrogen gas is oxidized and while protons move across the solid polymer towards the cathode, electrons flow towards the anode though the external circuit 7 producing an electrical current.

At the cathode 3, oxygen gas or air is fed at the inlet 8 of the cathode 3 following the direction of arrow 9. Oxygen gas, electrons and protons combine at the cathode producing water that leaves the fuel cell through outlet 10 following the direction of arrow 11.

Excess of fuel leaves the anode 2 via outlet 12 following the direction of arrow 13. At the outlet 12, the measurement of the velocity of the fluid steam occurs. This may be done through direct measurement at outlet 12, e.g. by locating a means for measuring velocity at location 14. This means may be a hot wire anemometer. However means for measuring velocity may be present at other locations of the outlet.

Figure 4:
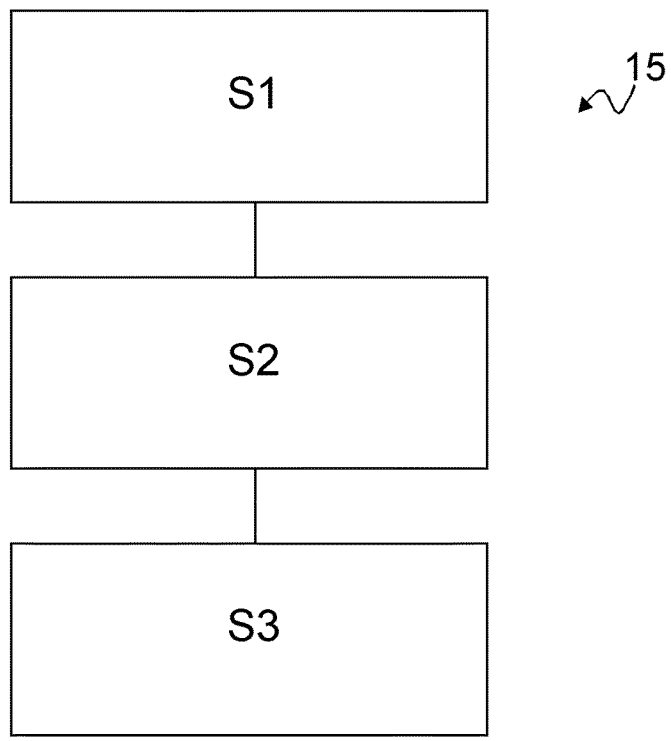
FIG. 4 is a flow-chart of a method according to one aspect of the invention.

FIG. 4 is a flow-chart of a method according to one aspect of the invention. The method of operating a fuel cell 15 comprises the steps of:
  measuring (S1) the velocity of a stream of fluid at the outlet of at least one electrode of a fuel cell
  determining (S2) $r_d$ as a function of said velocity measurement; and
  adjusting (S3) the temperature of said fuel cell as a function of the variation of said net water drag coefficient.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method of determining the net water drag coefficient ($r_d$) in a fuel cell, the method comprising:
   measuring the velocity of a stream of fluid at the outlet of at least one electrode of a fuel cell; and
   determining $r_d$ as a function of said velocity measurement.

2. The method of determining $r_d$ in a fuel cell according to claim 1, wherein said fuel cell is a proton exchange membrane (PEM) fuel cell.

3. The method of determining $r_d$ in a fuel cell according to claim 1, wherein said at least one electrode is the anode of said fuel cell.

4. The method of determining $r_d$ in a fuel cell according to claim 1, wherein the stoichiometric flow ratio (Ed) of the fluid fed to said fuel cell is in the range between 1 and 1.5.

5. The method of determining $r_d$ in a fuel cell according to claim 1, wherein the relation between the measured velocity (v) of a stream of fluid at the outlet of at least one electrode of said fuel cell and $r_d$ is linear or substantially linear.

6. The method of determining $r_d$ in a fuel cell according to claim 1, wherein said measured velocity is in the range between 0.3 and 30 m/s.

7. The method of determining $r_d$ in a fuel cell according to claim 1, wherein said velocity is measured by a hot wire anemometer.

8. A method of operating a fuel cell, the method comprising:
   determining $r_d$ in a fuel cell according to claim 1; and
   adjusting the temperature of said fuel cell as a function of the variation of said $r_d$.

9. The method of operating a fuel cell according to claim 8, wherein adjusting the temperature of said fuel cell comprises adjusting the flow rate of a liquid cooling said fuel cell as a function of the variation of said net water drag coefficient.

10. A method of operating a fuel cell, the method comprising:
    determining the net water drag coefficient ($r_d$) in a fuel cell; and
    adjusting the temperature of said fuel cell as a function of the variation of said net water drag coefficient ($r_d$).

11. The method of operating a fuel cell according to claim 10, wherein adjusting the temperature of said fuel cell comprises adjusting the flow rate of a liquid cooling said fuel cell as a function of the variation of said net water drag coefficient ($r_d$).

12. A method for monitoring and adjusting the water balance of a fuel cell, the method comprising:
    determining the $r_d$ in a fuel cell according to claim 1; and
    adjusting the temperature of said fuel cell as a function of the variation of said $r_d$.

* * * * *